(12) United States Patent
Bianchini et al.

(10) Patent No.: US 8,907,842 B1
(45) Date of Patent: Dec. 9, 2014

(54) METHOD AND APPARATUS FOR ATTENUATING A TRANSMITTED FEEDTHROUGH SIGNAL

(75) Inventors: Michael J. Bianchini, North Easton, MA (US); Terry J. Kirn, Andover, MA (US); David D. Coffin, Concord, MA (US)

(73) Assignee: Raytheon Company, Waltham, MA (US)

( * ) Notice: Subject to any disclaimer, the term of this patent is extended or adjusted under 35 U.S.C. 154(b) by 350 days.

(21) Appl. No.: 13/550,890

(22) Filed: Jul. 17, 2012

Related U.S. Application Data

(63) Continuation-in-part of application No. 12/466,066, filed on May 14, 2009, now abandoned.

(60) Provisional application No. 61/163,274, filed on Mar. 25, 2009.

(51) Int. Cl.
G01S 13/00 (2006.01)
G01S 7/40 (2006.01)
H04B 1/52 (2006.01)

(52) U.S. Cl.
CPC ..................................... *H04B 1/525* (2013.01)
USPC ............ 342/159; 342/165; 342/174; 342/198

(58) Field of Classification Search
CPC ....... G01S 5/021; G01S 5/0252; G01S 7/023; G01S 7/40–7/4056; H04B 1/10; H04B 1/525
USPC .......................................... 342/159–174, 198
See application file for complete search history.

(56) References Cited

U.S. PATENT DOCUMENTS

| | | | | |
|---|---|---|---|---|
| 3,021,521 | A | * | 2/1962 | Hutchins ...................... 342/175 |
| 3,256,520 | A | * | 6/1966 | Blitz ............................ 342/128 |
| 3,564,258 | A | * | 2/1971 | Feingold ...................... 398/204 |
| 4,197,540 | A | * | 4/1980 | Riggs et al. .................. 342/201 |
| 4,216,472 | A | | 8/1980 | Albanese |
| 4,725,842 | A | * | 2/1988 | Mayberry ..................... 342/198 |
| 4,968,967 | A | * | 11/1990 | Stove ........................... 342/165 |
| 4,970,519 | A | * | 11/1990 | Minnis et al. ................ 342/165 |
| 5,473,332 | A | * | 12/1995 | James et al. .................. 342/159 |
| 5,646,625 | A | * | 7/1997 | Burrier ......................... 342/175 |
| 5,861,837 | A | * | 1/1999 | Richardson et al. .......... 342/198 |
| 5,911,692 | A | | 6/1999 | Hussain et al. |
| 5,966,048 | A | | 10/1999 | Thompson |
| 5,969,667 | A | * | 10/1999 | Farmer et al. ................ 342/165 |
| 6,043,791 | A | | 3/2000 | Kinsey |
| 6,166,701 | A | | 12/2000 | Park et al. |
| 6,496,158 | B1 | | 12/2002 | Ksienski et al. |

(Continued)

OTHER PUBLICATIONS

U.S. Appl. No. 13/826,926 Response filed on Jun. 25, 2014 7 pages.

(Continued)

*Primary Examiner* — Peter Bythrow
(74) *Attorney, Agent, or Firm* — Daly, Crowley, Mofford & Durkee, LLP

(57) ABSTRACT

A radar system includes a receiver that is capable of attenuating transmitter feedthrough in a receive signal. In some embodiments, a fixed frequency notch filter is used to attenuate feedthrough at an intermediate frequency (IF). In other embodiments, an electronically tunable notch filter is used. Phase compensation may be provided to correct for a phase shift of the notch filter.

36 Claims, 13 Drawing Sheets

(56) References Cited

U.S. PATENT DOCUMENTS

| | | | |
|---|---|---|---|
| 6,507,315 B2 | 1/2003 | Purdy et al. | |
| 6,567,648 B1 * | 5/2003 | Ahn et al. | 455/83 |
| 6,799,014 B2 | 9/2004 | Rosen et al. | |
| 6,801,153 B2 * | 10/2004 | Rauch et al. | 342/21 |
| 6,856,284 B1 | 2/2005 | Cangiani | |
| 6,933,878 B1 | 8/2005 | Molyneux-Berry | |
| 6,963,312 B2 | 11/2005 | Schuneman et al. | |
| 7,043,208 B2 * | 5/2006 | Nigra | 455/78 |
| 7,180,457 B2 | 2/2007 | Trott et al. | |
| 7,202,812 B2 * | 4/2007 | Krikorian et al. | 342/198 |
| 7,474,262 B2 | 1/2009 | Alland | |
| 7,477,921 B2 | 1/2009 | Shattil | |
| 7,492,313 B1 | 2/2009 | Ehret et al. | |
| 7,538,564 B2 | 5/2009 | Ehrmann et al. | |
| 7,570,201 B1 * | 8/2009 | Watkins et al. | 342/174 |
| 7,576,683 B2 * | 8/2009 | Thomas et al. | 342/120 |
| 7,609,199 B2 * | 10/2009 | Nishijima et al. | 342/175 |
| 7,724,182 B2 * | 5/2010 | Inoue et al. | 342/172 |
| 7,808,427 B1 | 10/2010 | Sarcione et al. | |
| 7,969,350 B2 * | 6/2011 | Winstead et al. | 342/198 |
| 8,036,623 B2 * | 10/2011 | Chang et al. | 455/296 |
| 8,526,903 B2 * | 9/2013 | Gudem et al. | 455/310 |
| 8,620,251 B2 * | 12/2013 | Mui et al. | 455/307 |
| 2002/0072344 A1 * | 6/2002 | Souissi | 455/296 |
| 2004/0080463 A1 | 4/2004 | Jeong | |
| 2004/0203458 A1 * | 10/2004 | Nigra | 455/67.13 |
| 2005/0146477 A1 | 7/2005 | Kelly et al. | |
| 2006/0273952 A1 * | 12/2006 | Krikorian et al. | 342/198 |
| 2007/0085727 A1 * | 4/2007 | Backes et al. | 342/68 |
| 2007/0173282 A1 * | 7/2007 | Noda et al. | 455/550.1 |
| 2007/0279278 A1 * | 12/2007 | Stewart | 342/159 |
| 2008/0204318 A1 | 8/2008 | Thomas et al. | |
| 2008/0227409 A1 * | 9/2008 | Chang et al. | 455/78 |
| 2008/0242245 A1 * | 10/2008 | Aparin | 455/126 |
| 2008/0272959 A1 * | 11/2008 | Meharry et al. | 342/174 |
| 2009/0213770 A1 * | 8/2009 | Mu | 370/281 |
| 2009/0232260 A1 * | 9/2009 | Hayashi et al. | 375/346 |
| 2012/0309328 A1 * | 12/2012 | Morrison et al. | 455/78 |

OTHER PUBLICATIONS

U.S. Appl. No. 13/826,926 Notice of Allowance dated Mar. 14, 2013 6 pages.
U.S. Appl. No. 12/635,916, filed Dec. 11, 2009.
U.S. Appl. No. 12/635,893, filed Dec. 11, 2009.
U.S. Appl. No. 12/730,533, filed Dec. 11, 2009.
Notice of Allowance U.S. Appl. No. 13/826,926 dated Aug. 19, 2013, 11 pages.
U.S. Appl. No. 13/329,682 Office Action dated Mar. 31, 2014, 11 pages.
Office Action dated Jul. 31, 2014 for U.S. Appl. No. 13/331,334, filed Dec. 20, 2011 20 pages.

* cited by examiner

METHOD AND APPARATUS FOR ATTENUATING A TRANSMITTED FEEDTHROUGH SIGNAL

CROSS REFERENCE TO RELATED APPLICATIONS

The present application is a continuation-in-part (CIP) of application Ser. No. 12/466,066, filed on May 14, 2009 which claims the benefit of U.S. Provisional Patent Application No. 61/163,274, filed on Mar. 25, 2009, which are both incorporated herein by reference.

BACKGROUND

As is known in the art, one issue in continuous wave (CW) radars, such as FMCW and interrupted CW, is that part of the transmitted signal leaks through to the receiver and can degrade dynamic range performance. Usually in a CW radar, transmission and reception occur on the same antenna resulting in a direct path feedthrough. However, feedthrough can also occur in radars in which the transmitting antenna is separated from the receiving antenna, the target of interest is far from both, and some of the transmitted signal reflects from a cloud or other object entering the receiver ahead (in time) of the reflected target signal.

Prior art techniques for reducing transmitter feedthrough into the receiver are disclosed in U.S. Pat. Nos. 3,021,521, 4,970,519 and 5,646,625. These techniques rely on some form of direct coupling of the transmitted signal to the receiver where that signal is combined into the receiver in a destructive manner such that the transmitter component that came into the receive antenna is nulled out. A block diagram of a prior art generic feedthrough nulling circuit is shown in FIG. 1. The circuit of FIG. 1 may be acceptable for use in systems with a limited number of receiver channels, where the receiver is physically close to the transmitter, and the received frequency is the same as the transmitted frequency. When the receiver is hundreds of feet away (or more) from the transmitter and when there are many receiver channels used, the prior art system of FIG. 1 becomes impractical due to the number of transmit signals that must be split or routed to all the receiver channels. Such a design would incur a significant cost in amplifiers and/or very long cables if the receive antenna is large and the receivers are dispersed. Also, if the transmitter and the receiver are not on the same frequency simultaneously, the system of FIG. 1 does not work. A similar problem occurs in telecommunications using full duplex radios that must allow simultaneous transmit and receive on different frequencies.

One known attempt to address these types of feedthrough problems lies in separating the different transmit and receive from each other by use multiplexing filters (a.k.a. frequency division multiplexing). An example of its use is shown in FIG. 2 contained in U.S. Pat. No. 4,197,540. In radar receivers, use can also be made of the target Doppler shift which makes the receive frequency different from the transmitted frequency is shown in FIG. 3.

SUMMARY

The present invention provides methods and apparatus for a radar system to attenuate feedthrough using a filter having a selected stopband. In an exemplary embodiment, a satellite tracking radar system attenuates a presently transmitted signal frequency while receiving target return from a previously transmitted signal frequency. The presently transmitted frequency may be placed at an intermediate frequency corresponding to the filter stopband while the signal return passes through the filter. In another approach, an electronically tunable notch filter may be used that has an adjustable stop band frequency.

In one aspect of the invention, a radar system to attenuate feedthrough comprises a first combiner to downconvert a received signal to a first intermediate frequency having a fixed frequency, a second combiner to combine the first intermediate frequency and a second signal, the second signal comprising a fixed frequency component and an offset component, the offset component corresponding to a difference in frequency between a signal transmitted at a given point in time and a signal received as target return at the given point in time, and a filter having a fixed stopband to receive an output of the second combiner for attenuating the downconverted signal transmitted at the given point in time and passing the downconverted target return signal received at the given point in time.

The radar system can further include one or more of the following features: a phase compensation module to compensate for a phase change from the filter, the phase compensation module includes a third combiner, the first combiner comprises a first mixer to receive the received signal return and a first local oscillator signal, the radar system is operative to track satellites, the radar system uses a GPS-disciplined signal to generate local oscillator frequencies to downconvert the received signal, and the filter stopband is about 100 kHz wide.

In another aspect of the invention, a method comprises down-converting, using a first combiner, a received signal to a first intermediate frequency having a fixed frequency, combining, using a second combiner, the first intermediate frequency and a second signal, the second signal comprising a fixed frequency component and an offset component, the offset component corresponding to a difference in frequency between a signal transmitted at a given point in time and a signal received as target return at the given point in time, and filtering an output of the second combiner with a filter having a stopband for attenuating the downconverted signal transmitted at the given point in time and passing the downconverted target return signal received at the given point in time.

The method can further include one or more of the following features: performing phase compensation to compensate for a phase change from the filter, performing the phase compensation using a third combiner, the first combiner comprises a first mixer to receive the received signal return and a first local oscillator signal, the received signal includes reflection from satellites, and using a GPS-disciplined signal to derive local oscillator frequencies to downconvert the received signal.

In a further aspect of the invention, a satellite tracking radar system comprises: a global positioning satellite (GPS) disciplined signal source, a first mixer to receive signal return from an antenna array, to receive a first local oscillator signal derived from the GPS disciplined signal source, and to output a first intermediate frequency at a fixed frequency, a second mixer to receive the first intermediate frequency, to receive a second local oscillator signal, and to output a second intermediate frequency signal, wherein the second local oscillator signal includes a fixed frequency component and an offset component, which corresponds to a difference in frequency between a signal transmitted at a given point in time and a signal received as target return at the given point in time, and a filter having a fixed stopband to receive the second intermediate frequency signal and attenuate the downconverted signal transmitted at the given point in time and pass the downconverted target return signal received at the given point in time.

In still another aspect of the invention, a radio frequency (RF) receiver system for use in a radar system comprises: a receive antenna to receive a signal from a surrounding environment, the received signal having a transmitter feedthrough component and a return signal component, wherein the transmitter feedthrough component and the return signal component are at different frequencies; a first mixer to downconvert the received signal using a variable frequency local oscillator (LO) signal to generate a first IF signal having a transmitter feedthrough component at one frequency and a return signal component at another frequency, both in a first IF bandwidth; a notch filter having a fixed stop band; a second mixer to downconvert the first IF signal using a fixed frequency LO signal to generate a second IF signal having a transmitter feedthrough component at a frequency corresponding to the stop band of the notch filter and a return signal component at a frequency outside the stop band of the notch filter, wherein the notch filter is operative to filter the second IF signal to generate a filtered signal, wherein the notch filter attenuates the transmitter feedthrough component of the second IF signal and substantially passes the return signal component of the second IF signal.

In yet another aspect of the invention, a method of operating an RF receiver in a radar system comprises: receiving a signal having a transmitter feedthrough component and a return signal component, wherein the transmitter feedthrough component and the return signal component of the received signal are at different frequencies; downconverting the received signal using a variable frequency local oscillator (LO) signal to generate a first intermediate frequency (IF) signal having a transmitter feedthrough component at one frequency and a return signal component at another frequency, both in a first IF bandwidth; downconverting the first IF signal using a fixed frequency LO signal to generate a second IF signal having a transmitter feedthrough component at a frequency within a stop band of a fixed-band notch filter and a return signal component at a frequency outside the stop band of a fixed-band notch filter; and applying the second IF signal to the fixed-band notch filter to generate a filtered signal having an attenuated transmitter feedthrough component.

In a further aspect of the invention, an RF receiver system for use in a radar system comprises: a receive antenna to receive a signal from a surrounding environment, the received signal having a transmitter feedthrough component and a return signal component, wherein the transmitter feedthrough component and the return signal component are at different frequencies; a first mixer to downconvert the received signal using a variable frequency local oscillator (LO) signal to generate a first IF signal having a transmitter feedthrough component and a return signal component; and an electronically tunable notch filter having an adjustable stop band frequency to filter the first IF signal to generate a filtered signal, wherein the electronically tunable notch filter is controlled to place the stop band at a frequency of the transmitter feedthrough component of the first IF signal. In one embodiment, the receiver system further includes a digital receiver to correct for a phase shift of the electronically tunable notch filter. In other embodiments, the receiver system includes a second mixer to downconvert the filtered signal to generate a second IF signal, where the second mixer uses an LO signal having a phase component to compensate for a phase shift of the electronically tunable notch filter.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the present invention provide methods and apparatus for a radar system including a digital beamforming system having a series of local oscillator (LO) signals sent to receivers and a synthesizer for moving the local oscillator frequencies so that the transmitted feedthrough signal is placed at a selected intermediate frequency (IF) within the receiver channel. In one embodiment, a filter having a given stop band is placed at that particular IF to attenuate the transmitted signal leakage. In order to not remove the signal of interest, the transmitter schedules the next transmit signal when the original is being received. In one embodiment, the synthesizer is GPS-disciplined, so that the receiver 'knows' the transmit frequency precisely. With this arrangement, the current (time) leakage signal is removed while the prior (time) signal, which includes signal return from a target, is received and processed.

It is understood that an exemplary radar system is shown and described having particular frequencies, filter characteristics, and components. It is further understood that other frequencies, filter characteristics, and practical components can be used in other embodiments to meet the needs of a particular application without departing from the scope of the invention. In addition, while exemplary embodiments are described in conjunction with tracking satellites, it is understood that the inventive embodiments are applicable to radar systems in general in which it is desirable to attenuate feedthrough.

Figure 1:
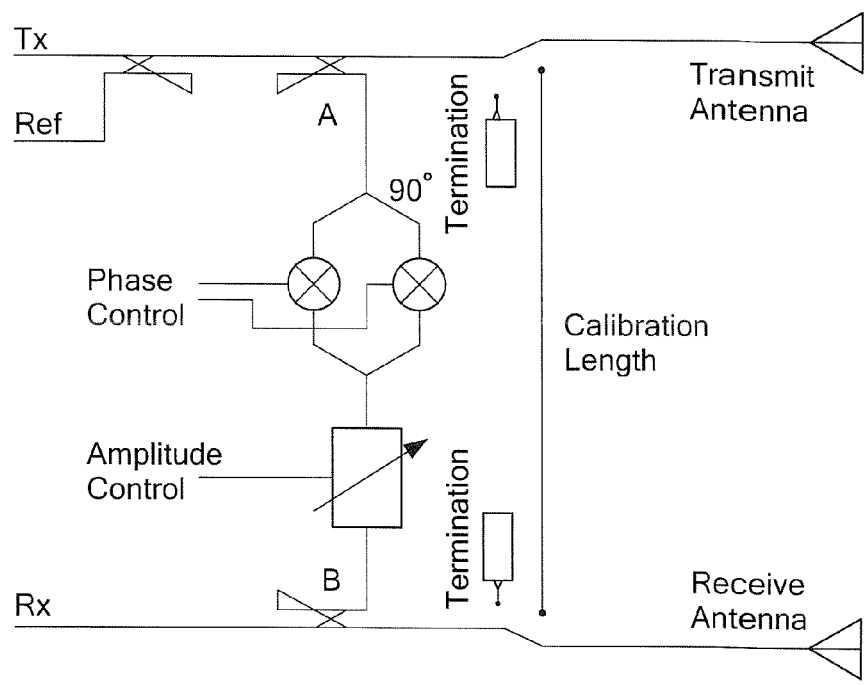
FIG. 1 is a schematic representation of a prior art transmit feedthrough nuller.
Figure 2:
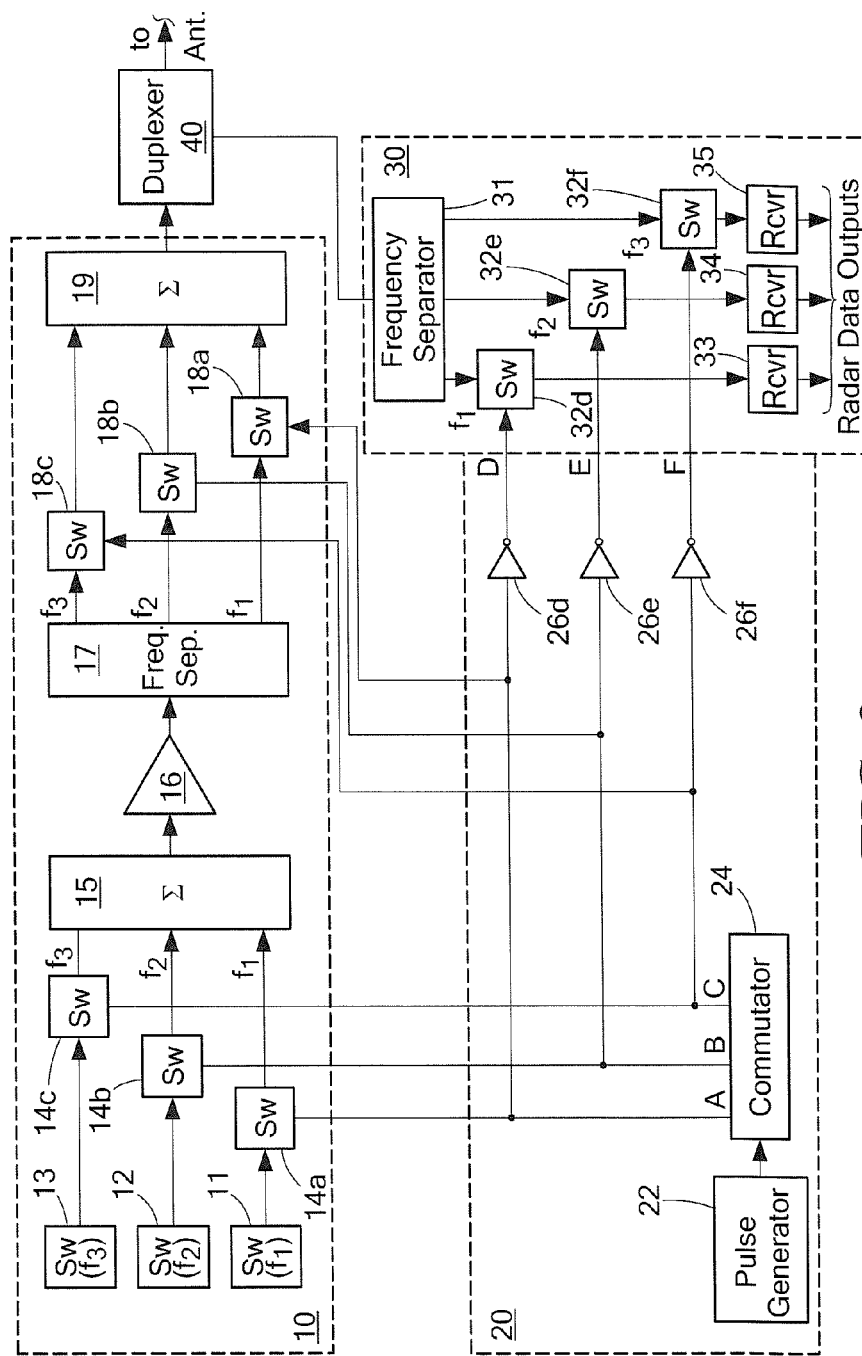
FIG. 2 is a schematic representation of a prior art simultaneous transmit and receive radar subsystem.
Figure 3:
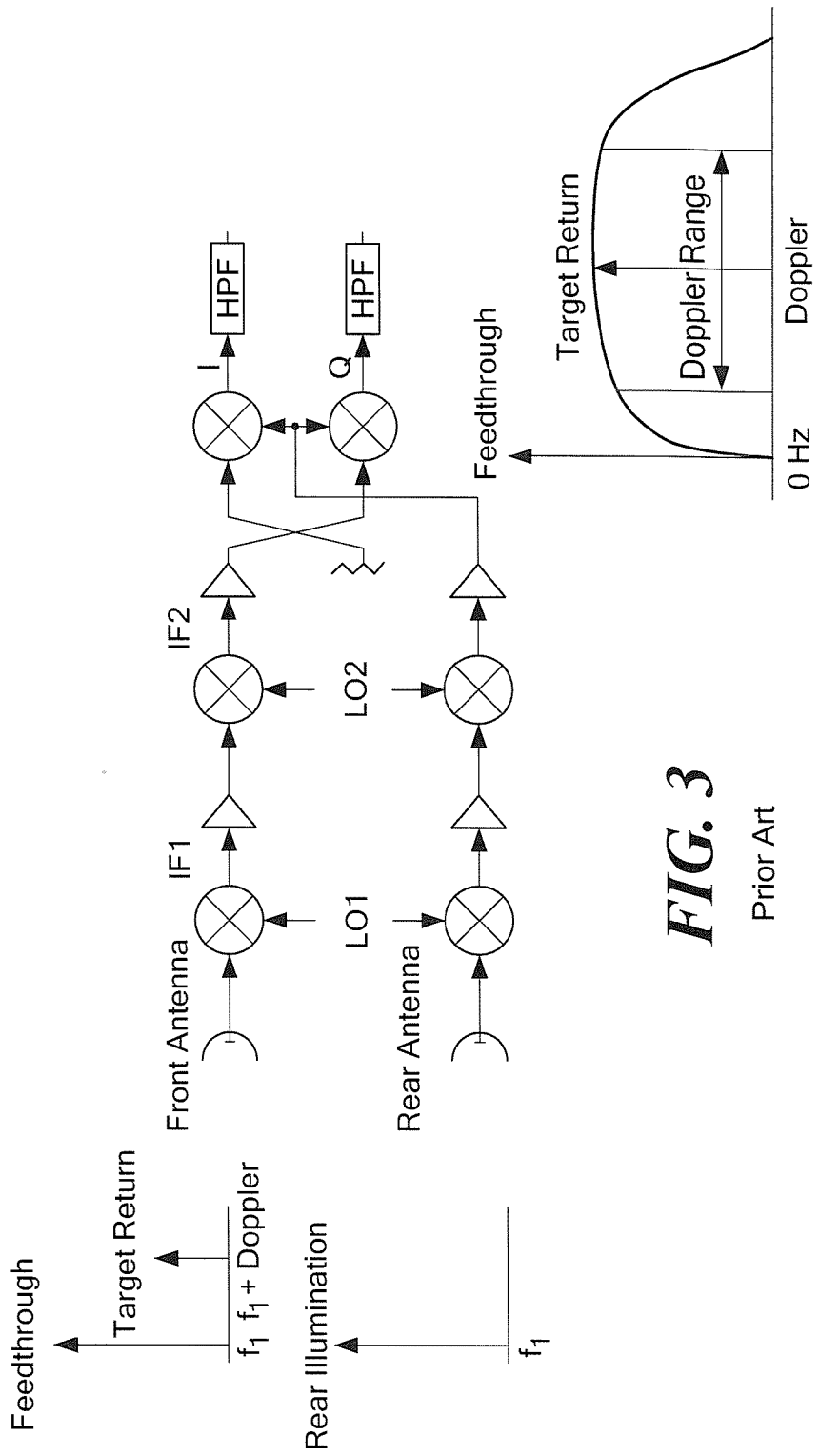
FIG. 3 is a schematic representation of a prior art circuit for removing feedthrough by highpass filtering at the baseband frequency.
Figure 4:
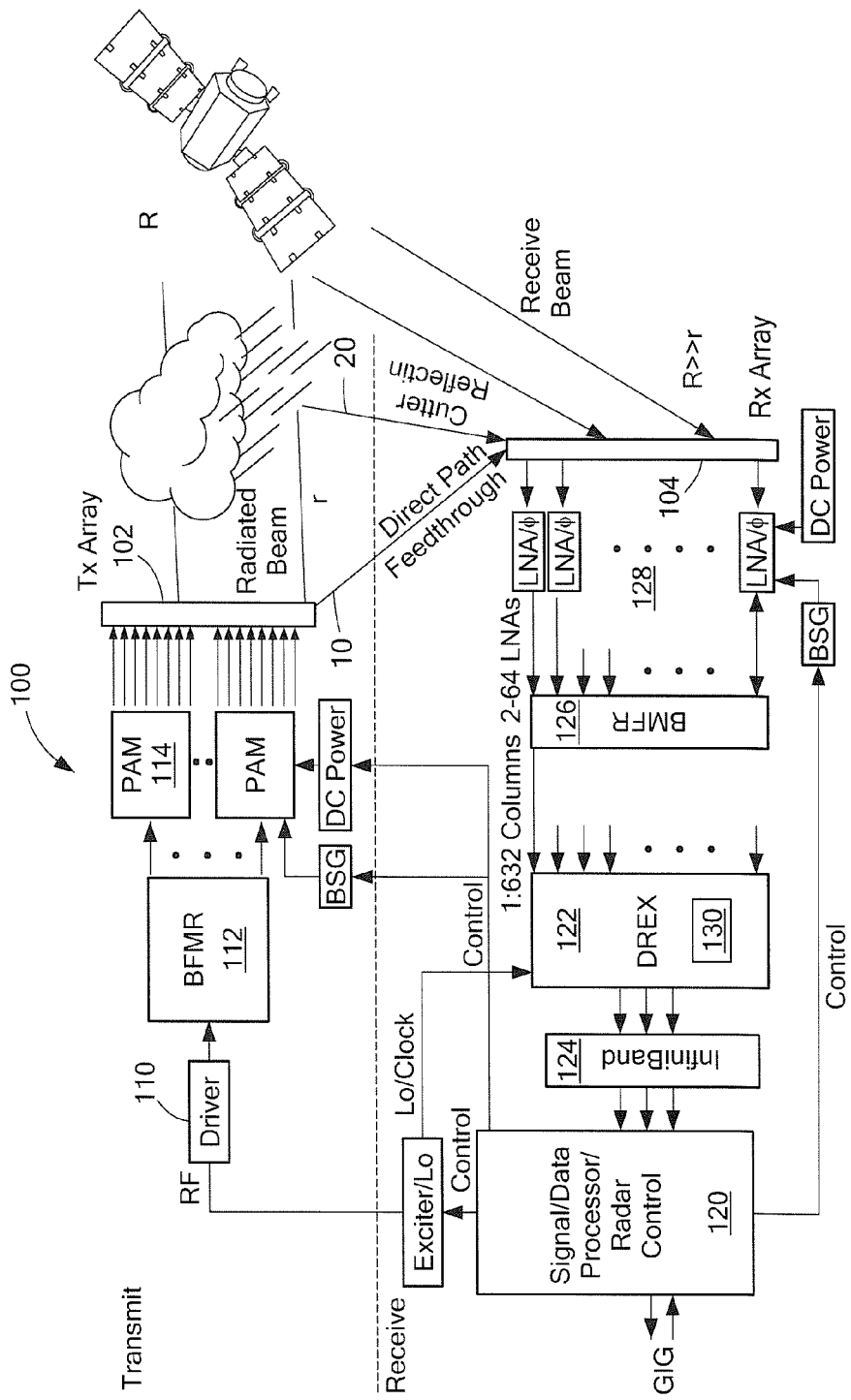
FIG. 4 is a schematic depiction of an exemplary radar system to attenuate a presently transmitted frequency at a selected intermediate frequency in accordance with exemplary embodiments of the invention.

FIG. 4 shows an exemplary phased array satellite tracking radar system 100 having digital beamforming with filtering to attenuate a presently transmitted signal from a presently received signal, i.e., reduce feedthrough. The satellite tracking phased array radar 100 has separate transmit and receive arrays 102, 104 with a remote target illustrating direct path feedthrough 10 and feedthrough 20 from a near object in the form of a weather formation. The system 100 includes on the transmit side a driver 110 coupled to a digital beamformer 112 feeding a PAM (Power Amplifier Module) 114, which energize the transmit array 102. The receive side includes a signal data processor control module 120 coupled to a digital receive system 122 via a universal I/O device 124, such as InfiniBand. The receive beamformer 126 receives input from the low noise amplifiers 128, which are coupled to the receive array 104. As described in detail below, the digital beamformer 122 includes a filter module 130 to remove the present transmitted frequency.

Figure 5A:
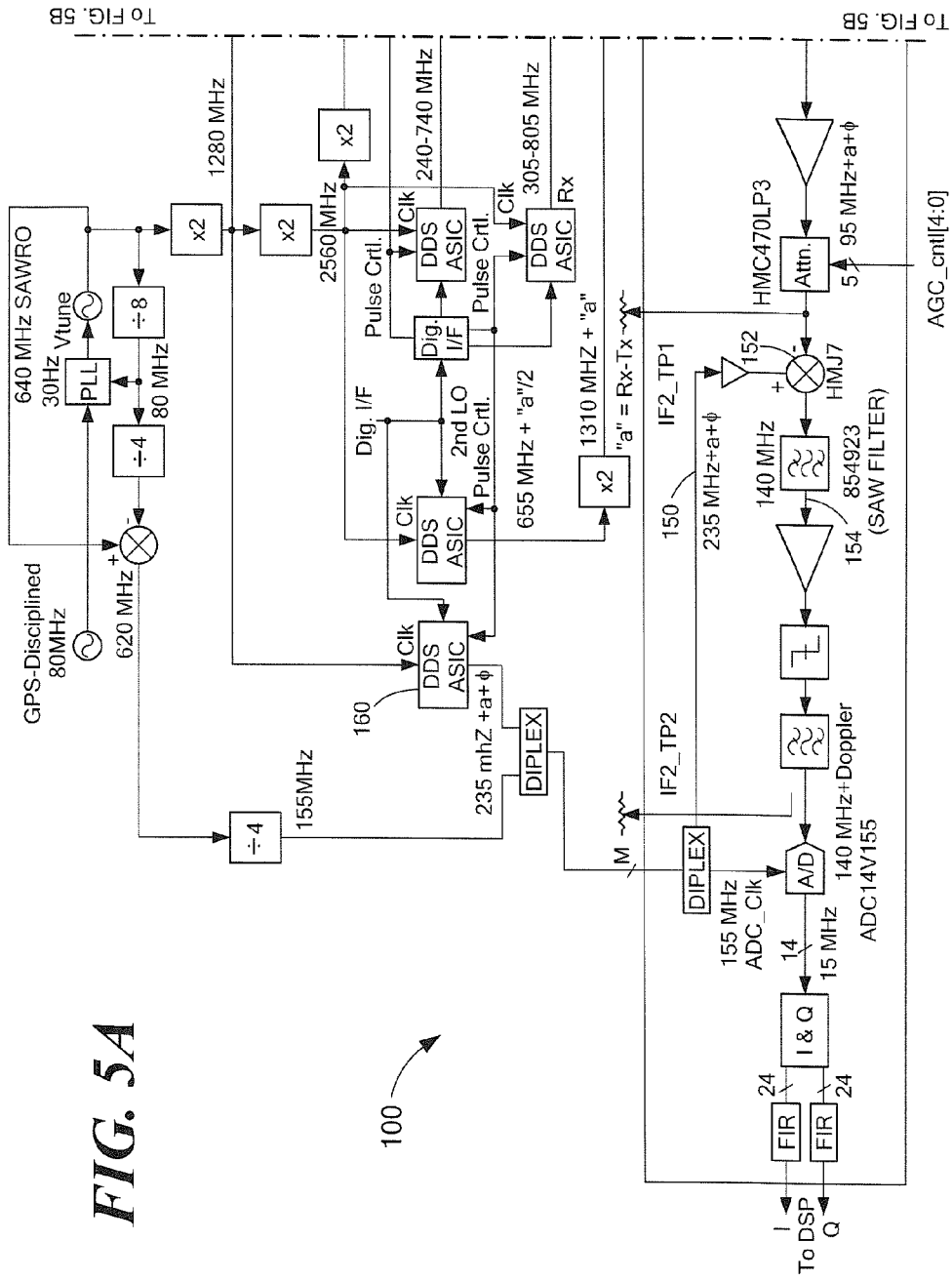
FIG. 5 is an exemplary schematic representation of a portion of a radar system having a synthesizer to send variable local oscillator signals to a receiver to maintain the transmitted frequency in a stop band.
Figure 5B:
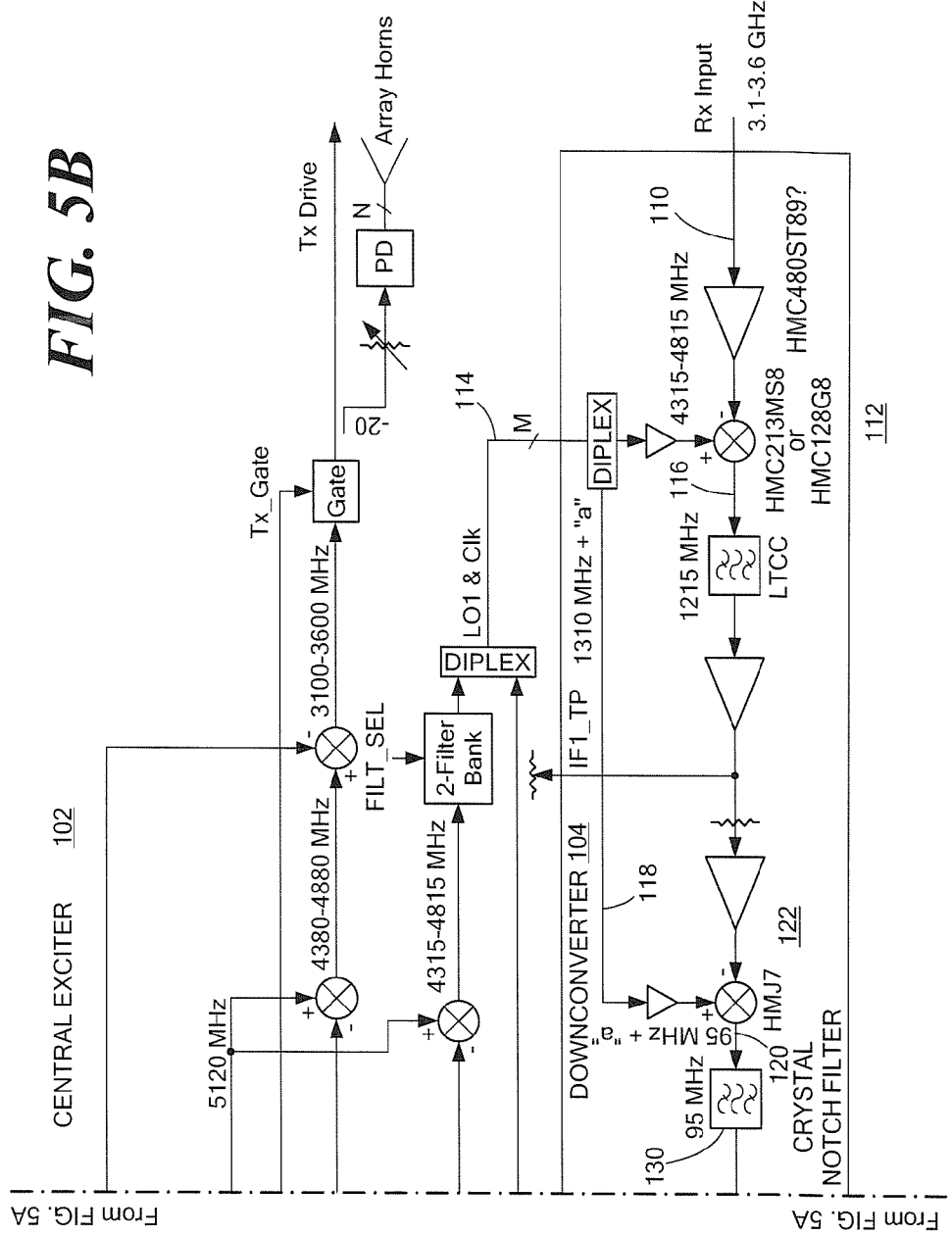

In the exemplary embodiment shown in FIG. 5, a signal is transmitted in the 3.1 to 3.6 GHz band, which is received sometime later at the receiver. It is desirable to receive the signal return from targets and attenuate feedthrough from the presently transmitted signal. For example, if a signal at time $t_0$ is transmitted at a frequency of 3300 MHz it will be received at some later time, e.g., $t_1$, after reflection from a target, such as a satellite. At time $t_1$, the receiver may be receiving signal return from the 3300 MHz signal and the transmitter may be transmitting at 3310 MHz. It is desirable at time $t_1$ to attenuate the presently transmitted signal at 3310 MHz received by the receiver since it is not signal return, but rather feedthrough and/or near object, e.g., cloud, non-target return.

The system 100 includes a central exciter module 102 coupled to a Downconverter module 104. The exciter module 102 receives a GPS-disciplined 80 MHz signal from which the desired signal frequency signals are generated for use by the Downconverter module 104 to provide I and Q signals to the signal processor.

In the illustrated embodiment, the receive signal 110 from the receive array ranges from 3.1 to 3.6 GHz and is provided to a first port of a first mixer 112. A first LO 114 is tuned from 4315 MHz to 4815 MHz and provided to the first mixer 112 such that the first IF 116 output from the first mixer 112 is centered at 1215 MHz. The 1215 MHz first IF signal 116 is provided to a second mixer 122.

A second LO 118 is tuned at 1310 MHz plus some offset "a" such that a second IF 120 output from a second mixer 122 is 95 MHz+"a" (1310−1215=95). In an exemplary embodiment, offset "a" corresponds to a difference between the present transmitted frequency and the signal being received. Note that offset "a" can be either positive or negative.

The second IF signal 120 is passed through a filter 130 having a stop band or notch at 95 MHz to attenuate the presently transmitted signal, i.e., the feedthrough. The second IF signal is then processed for phase and/or frequency change due to the filter, as described more fully below, by a third mixer 152.

In an exemplary embodiment, the filter 130 has a stop band or notch that remains constant. The offset "a" is effective to move the presently transmitted frequency to a particular intermediate frequency at the stop band of the filter. The remaining signal, including the signal return from the target, passes through the filter.

Figure 6:
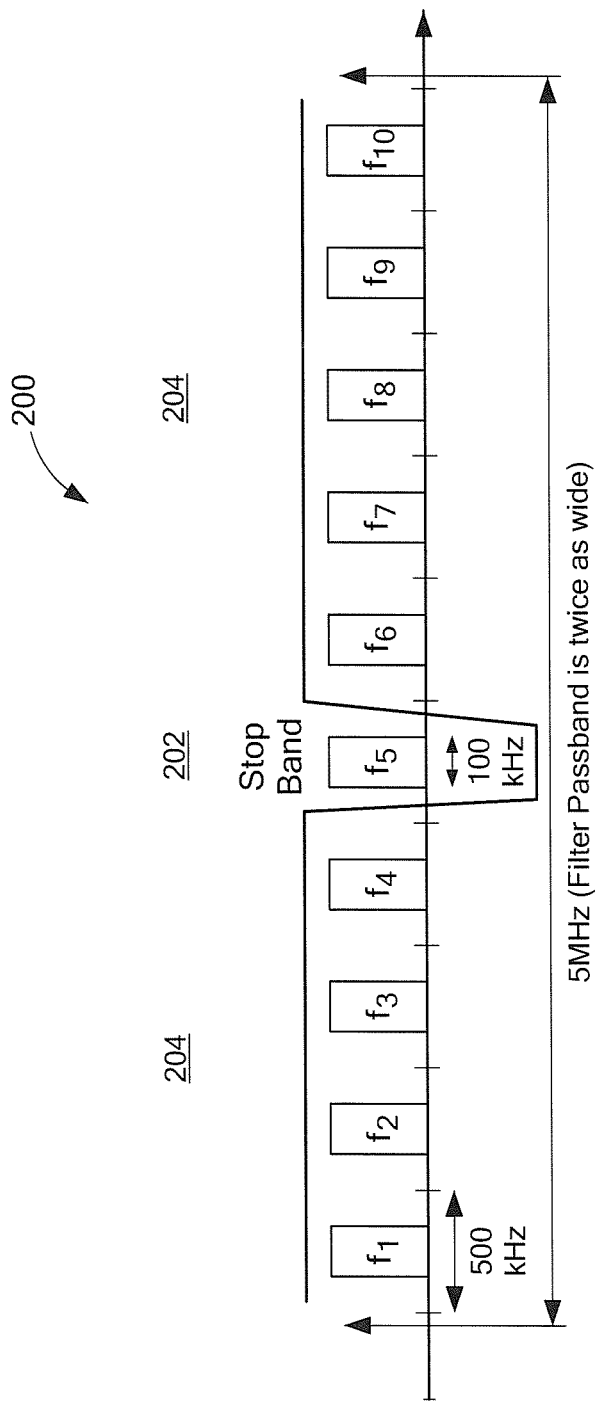
FIG. 6 is a pictorial representation of a filter having a fixed frequency stopband to remove the presently transmitted signal and pass the presently received signal return.

FIG. 6 shows an exemplary filter 200 having a stop band 202 and adjacent bandpass regions 204. In the illustrated embodiment, the presently transmitted signal frequency $f_5$ is attenuated by the stop band 202 of the filter while the remaining frequencies pass through the filter in the bandpass regions 204. In one embodiment, the stop band 202 is in the order of 100 kHz. The bandpass region 204 of the filter 200 is twice the second IF bandwidth occupancy so that $f_1$ could be attenuated while receiving $f_{10}$ and vice versa.

If the present transmit frequency changes again during reception on the same receive frequency, the local oscillator frequency can be changed to put the new transmit frequency into the notch again. It is understood the transmit frequency can be readily maintained in the notch if the receive frequency changes, providing the notch filter passband permits reception of the entire receive band.

Figure 7:
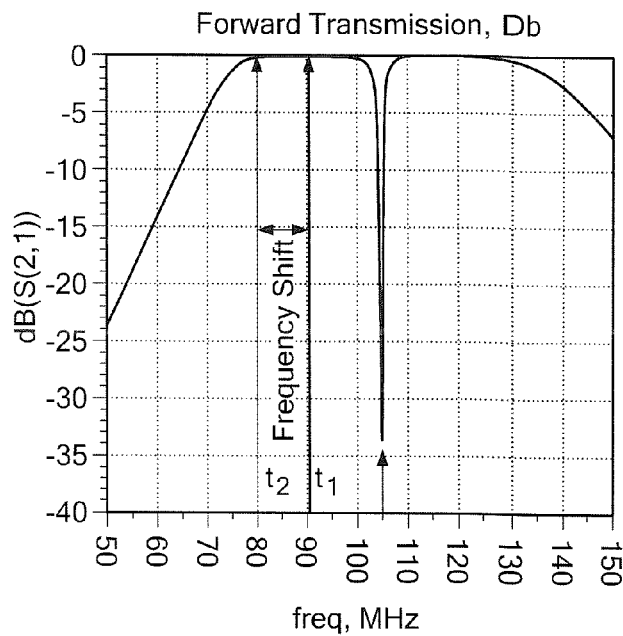
FIG. 7 illustrates the synthesizer shift used to keep the feedthrough inside the stopband of a second IF filter.

FIG. 7 shows for a first time $t_1$ a receive signal having a frequency that is 15 MHz below a present transmit frequency, e.g., offset $a_1$ is −15 MHz. The stop band is shown at 105 MHz in the illustrated embodiment. At a second time $t_2$, the presently transmitted frequency increases 10 MHz so offset $a_2$ is −25 MHz. So that the new presently transmitted frequency is at the stopband of the filter, the LO moves 10 MHz down moving the receive frequency further over in the bandpass region of the filter.

It is understood that there may be practical limitations to the width of the stop band of the filter for the illustrated and other frequency ranges. One of ordinary skill in the art will recognize that a variety of filter characteristics can vary to meet the needs of particular application without departing from the present invention. In addition, it is further understood that one or more additional filters can be used having adjacent stop band frequencies. Other embodiments can have filters and components to provide desired transmit and receive frequency granularity. Also, later developed filter technologies may enable further embodiments that fall within the scope of the invention.

Figure 8:
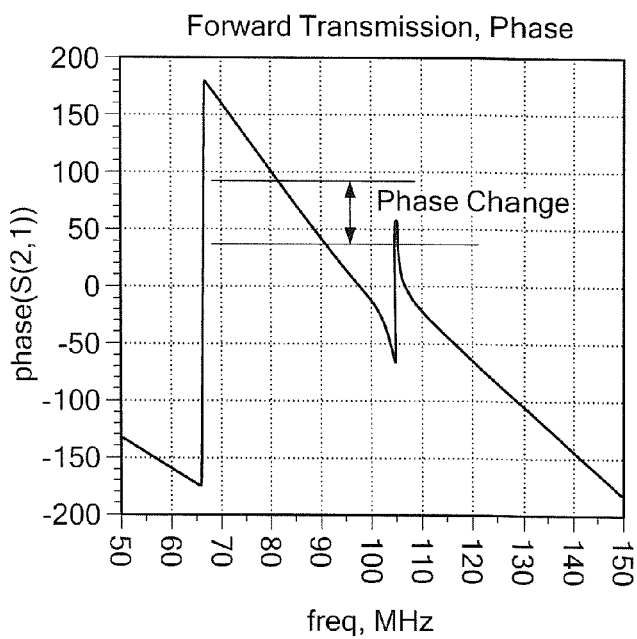
FIG. 8 is a graphical depiction of phase shift in the filter signal due to the frequency shift of FIG. 7.

It will be appreciated that while sliding the 'fence' of received signals relative to the stopband of the filter, the channel insertion phase of the received signal of interest may change as shown, for example, in FIG. 8. As can be seen, the phase shift from the filter can result in a change in the antenna pattern, which can be perceived as a target position change.

Referring again to FIG. 5, a DDS (Direct Digital Synthesizer) 160 produces a third LO (at 235 MHz+"a"+(φ)) signal 150 that changes the phase ((p) of the filtered signal to precisely remove the phase change of the received signal. Therefore, the third IF signal (at 140 MHz) 154 from the third mixer 152 always remains at the same frequency and phase.

Figure 9:
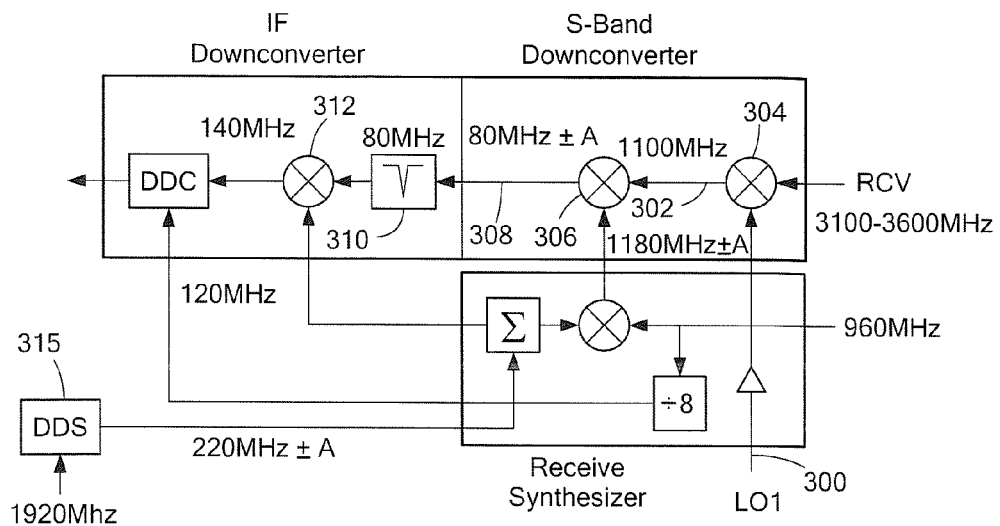
FIG. 9 is a block diagram of a system having a direct digital converter in the IF subsystem of the receiver to tune the filter phase change out of the baseband.

FIG. 9 shows an exemplary arrangement to tune the filter phase change out of the baseband. In an S-band Downconverter module receiving signal return, a first LO 300 provides a first IF 302 from a first mixer 304 to a second mixer 306, which outputs a second IF signal 308 at 80 MHz+/−offset "a." which is the difference between the received signal frequency and the present transmit signal. In an IF Downconverter module, a filter 310 with a stop band at 80 MHz filters the second IF signal and the output is provided to a third mixer 312, which receives a 220 MHz+"a" signal from a DDS 315. A Direct Digital Converter (DDC) 314 receives the 140 MHz signal from the third mixer 312 and compensates for the filter phase change.

Figure 10:
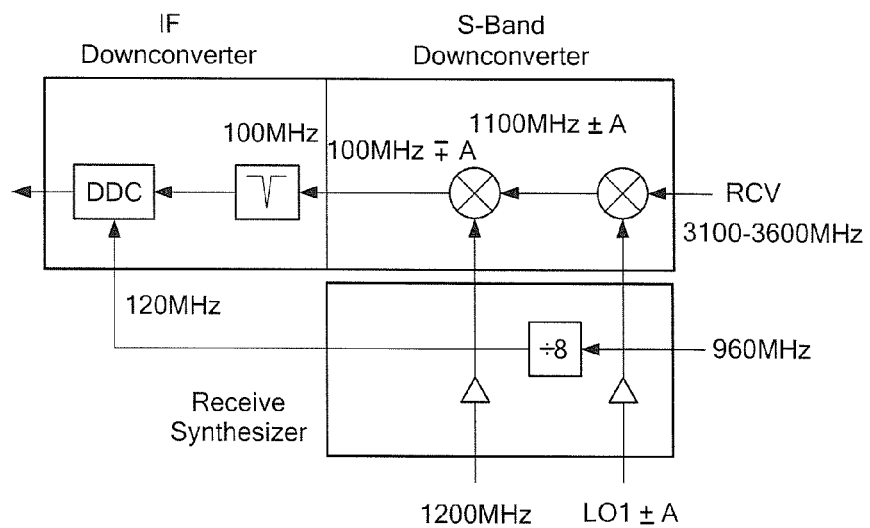
FIG. 10 is a block diagram of a system having a direct digital converter in the IF subsystem of the receiver to tune out the filter frequency and phase change out of the baseband.

FIG. 10 shows a further embodiment that is effective to compensate for the filter phase change and eliminates the need for the DDS 315 of FIG. 9. As can be seen, the first mixer receives LO1+"a." This arrangement may be more precise than removal by changing the phase of the third LO and is easier to calibrate at the system level. In an exemplary embodiment, the DDC is implemented as a field programmable gate array device. This configuration tunes the first LO and lets the IF frequencies be variable, for tuning to a constant in the Digital Receiver. This allows one less DDS in the synthesizer, further reducing cost.

An alternate embodiment includes an electronically tunable filter at the first IF of the receiver chain. In this arrangement, first and second LOs are nominally needed for a dual down conversion receiver. However, the second LO still requires the variable phase setting to mitigate the IF phase change from tuning the notch filter. It should be noted that electronically tunable filters may tune slowly or have relative difficulty in maintaining the notch bandwidth over the tuning range.

Figure 11:
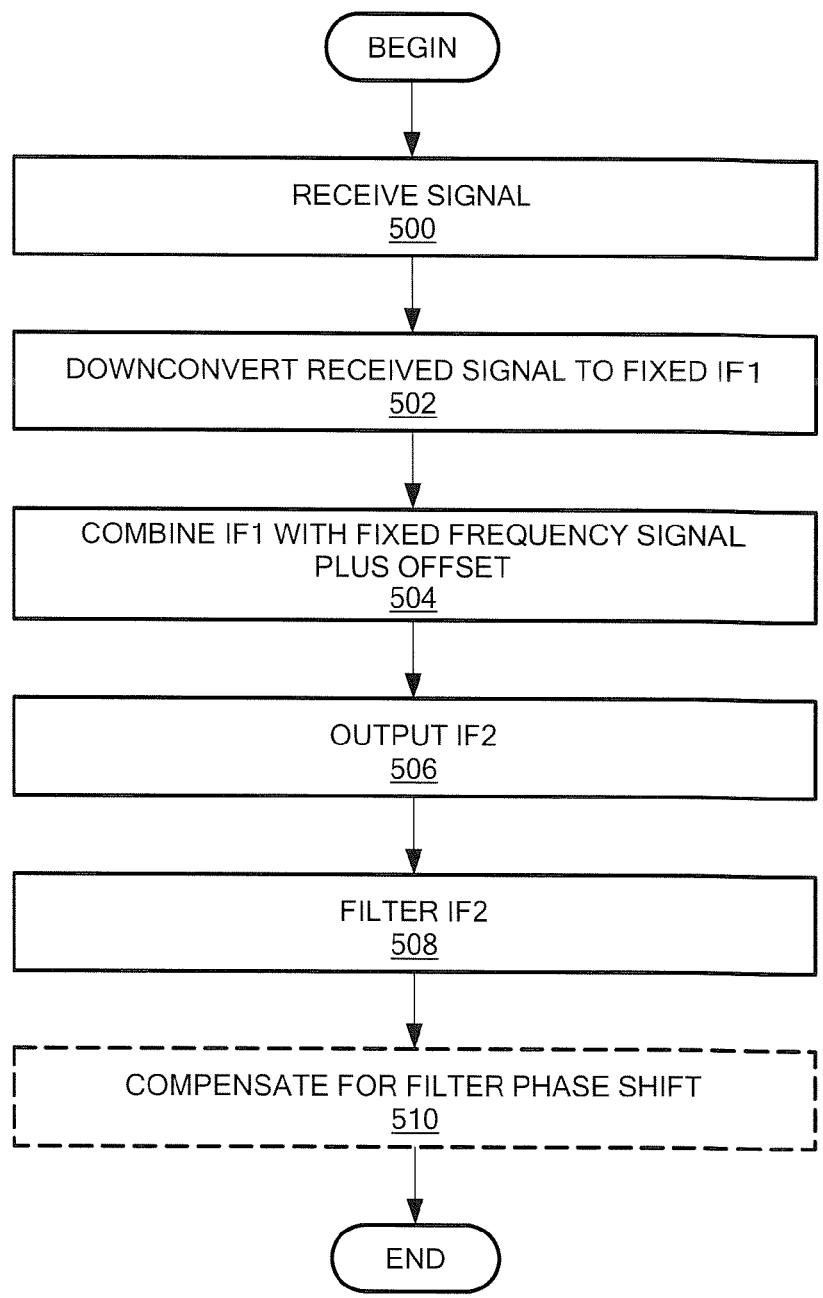
FIG. 11 is a flow diagram showing an exemplary sequence of steps to attenuate a presently transmitted frequency in accordance with exemplary embodiments of the invention.

FIG. 11 shows an exemplary sequence of steps for attenuating a present transmitted frequency in accordance with exemplary embodiments of the invention. In step 500, a signal is received by a receiver at time $t_1$. In step 502, the received signal is downconverted, such as by a mixer, to a first intermediate frequency (IF1) at a fixed frequency. A first local oscillator LO1 to the mixer varies in frequency to achieve the fixed IF frequency.

In step 504, the first intermediate frequency IF1 is provided to a second mixer, which also receives a signal having a fixed frequency component and an offset component. The offset component corresponds to a difference in frequency between a presently transmitted frequency and a presently received (desired) signal frequency. In step 506, the second mixer outputs the second intermediate frequency IF2. In step 508, the IF2 signal is filtered by a filter having a fixed stopband to attenuate the presently transmitted frequency while passing other received frequencies. The offset component is effective to keep the presently transmitted frequency in the fixed stopband. Changes in the presently transmitted frequency alter the offset component to maintain the presently transmitted frequency in the stop band while allowing other frequencies to pass. In optional step 510, phase compensation is provided for the phase shift from the filter.

Figure 12A:
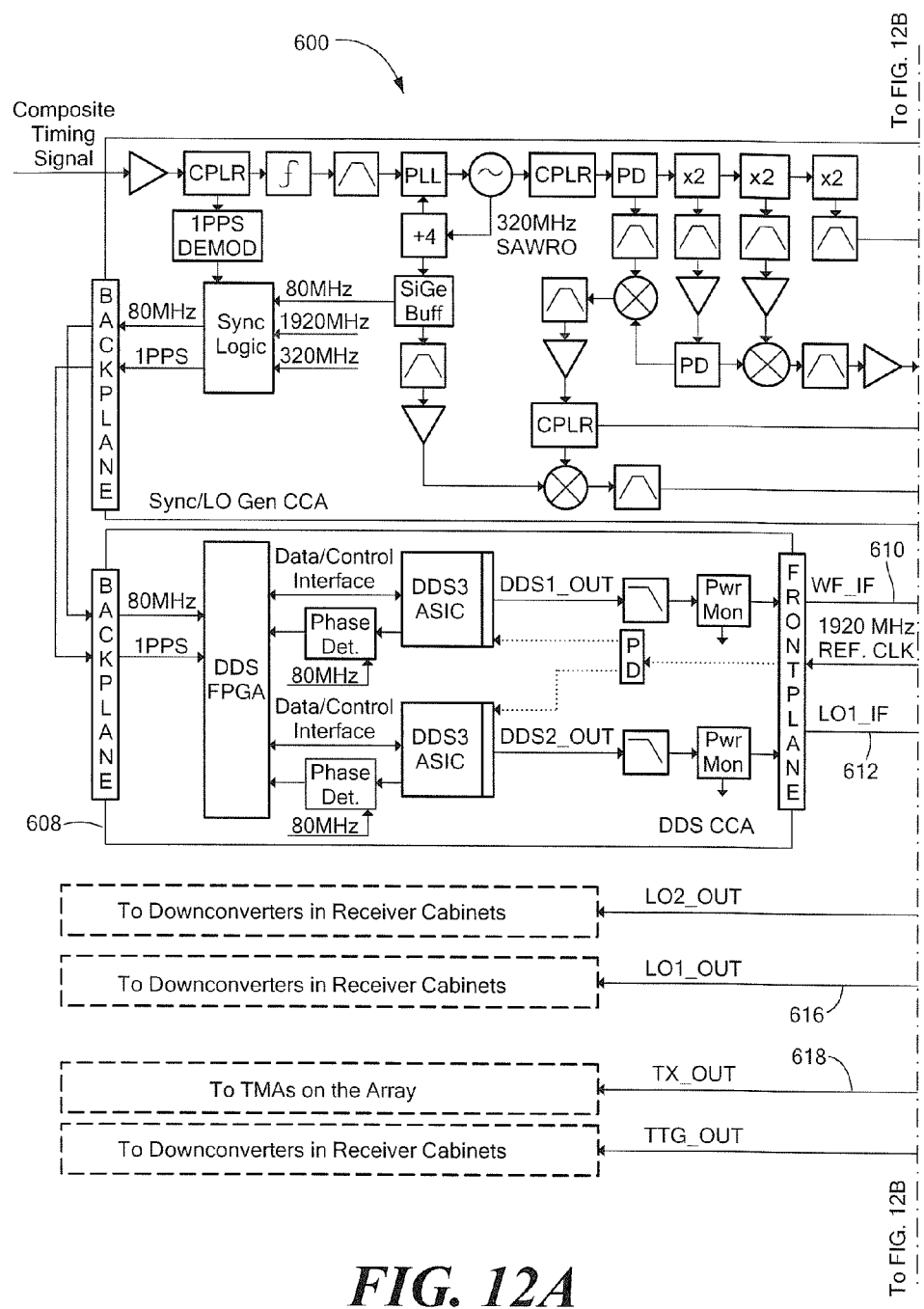
FIG. 12 is an exemplary schematic representation of a portion of a radar system having a synthesizer to send local oscillator signals to a receiver to maintain a transmitted frequency in a stop band of a notch filter in accordance with an embodiment.
Figure 12B:
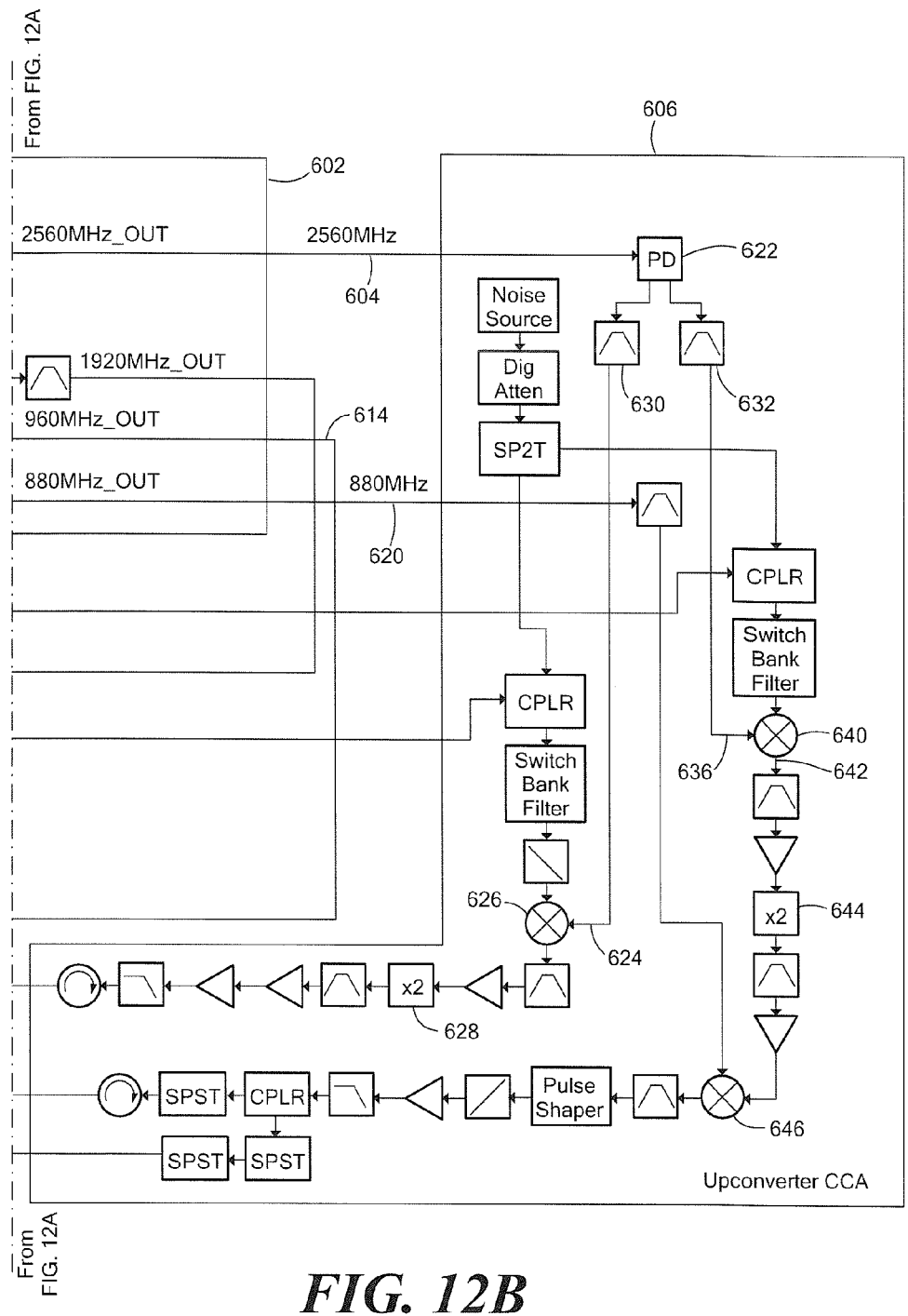

FIG. 12 illustrates synthesis circuitry 600 for use in a phased array satellite tracking radar system to reduce feedthrough in accordance with another embodiment. It has been discovered that, in some implementations, the adjustment of both $LO_1$ and $LO_2$ to move the transmitted signal to the stop band of the notch filter can result in the creation of undesirable spurs within the IF that can be passed by the notch filter. Synthesis circuitry 600 of FIG. 12 can be used to overcome this problem by only adjusting $LO_1$ and keeping $LO_2$ fixed. In the illustrated implementation, a local oscillator generator 602 generates a 2560 MHz reference signal 604 and an 880 MHz reference signal 620 and delivers the signals to an upconverter 606. LO generator 602 also generates a fixed 960 MHz reference signal 614 that is used as $LO_2$ in the downconverter (not shown) of the radar system. In addition, a direct digital synthesizer (DDS) 608 generates a WF_IF reference signal 610 and an LO1_IF reference signal 612. As will be described in greater detail, upconverter 606 uses the 2560 MHz reference signal 604, the 880 MHz reference signal 620, and the WF_IF reference signal 610 to generate the transmit signal TX_OUT 618 that will be delivered to the transmit arrays of the radar system. Upconverter 606 also uses the 2560 MHz reference signal 604 and the LO1_IF reference signal 612 to generate $LO_1$ for a first mixer in the downconverter subsystem (not shown) of the radar system. In at least one implementation, all of these signals are derived from a GPS-disciplined source.

As illustrated in FIG. 12, upconverter 606 includes a power divider 622 that divides the 2560 MHz reference signal 604 into two components. The two components are bandpass filtered in filters 630, 632. A first signal component 636 is delivered to a mixer 640 where it is mixed with a filtered version of WF_IF reference signal 610 to generate a frequency converted signal 642. Signal 642 is then filtered and amplified and applied to frequency doubler 644, which doubles the frequency of the signal. The resulting signal is then again filtered and amplified and applied to a mixer 646 which mixes the signal with a filtered version of 880 MHz reference signal 620. The output signal of mixer 646 is then sent through a pulse shaping circuit to limit spectral spillover and is ultimately output as transmit signal TX_OUT 618. The frequency of transmit signal 618 can be represented as follows:

$$TX = 2 \times (2560 \text{ MHz} - WF_{IF}) - 880 \text{ MHz} \uparrow$$

where ↑ signifies the direction of the chirp.

The second signal component 624 output by power divider 622 is delivered to a mixer 626 where it is mixed with a filtered version of LO1_IF reference signal 612. The resulting upconverted signal is filtered and amplified before being delivered to a frequency doubler 628. The doubled signal is then filtered and amplified again and output as $LO_1$ signal 616 that may be used in a first mixer in a downconverter subsystem receive chain of the radar system. The frequency of $LO_1$ signal 616 can be represented as follows:

$$LO_1 = 2 \times (2560 \text{ MHz} - LO_1\_IF)$$

The frequency of $LO_1$ signal 616 will therefore be nominally 880 MHz above the transmit frequency in this example implementation. By using filter banks in the up converter 606, any spurs associated with $LO_1$ and the transmit frequencies may be mitigated so that they do not create a problem in the notch filter. The first IF frequency in the downconverter may be represented as:

$$IF_1 = LO_1 - TX \downarrow$$

and the second IF frequency may be represented as:

$$IF_2 = LO_2 - IF_1 \uparrow.$$

As described above, $LO_2$ is fixed at 960 MHz in the example implementation. In one embodiment, the third IF frequency may be represented as:

$$IF_3 = 80 \text{ MHz} - LO_3 - IF_2 \downarrow.$$

where the 80 MHz represents the sampling frequency of an analog to digital converter. In this embodiment, $LO_3$ may tune with $LO_1$ to keep $IF_3$ constant. In at least one embodiment, the various LO signals described above (e.g., $LO_1$, $LO_2$, $LO_3$) may be applied to mixers in a downconverter sub-system of a radar system, such as downconverter 104 illustrated in FIGS. 5A and 5B. It should be appreciated that the specific frequencies used in the above example are merely representative of a particular embodiment and can be modified in other implementations.

As described previously, one benefit of the synthesis circuitry 600 of FIG. 12 is that it reduces the likelihood that undesirable spurs will be created within the IF that can subsequently be passed by the notch filter. The synthesis circuitry 600 of FIG. 12 also requires one less DDS than the synthesis circuitry shown in FIGS. 5A and 5B. The synthesis approach of FIG. 12 also facilitates the performance of the phase correction for the notch filter in the digital receiver (i.e., in the digital downconverter (DDC)). Therefore, instead of applying the phase correction using one of the analog mixers in the receiver chain, an IF signal in one of the IF portions of the receiver chain may be digitized in an analog to digital (A/D) converter, split into in-phase (I) and quadrature (Q) channels, and the phase correction for the bandstop filter may be applied digitally on the I and Q data. The final down conversion to baseband may also be performed in the digital receiver. A digital processor may be used to process the I and Q data. Any type of digital processor may be used including, for example, a digital signal processor (DSP), a general purpose microprocessor, a reduced instruction set computer (RISC), a microcontroller, a blade server, and/or others.

Figure 13:
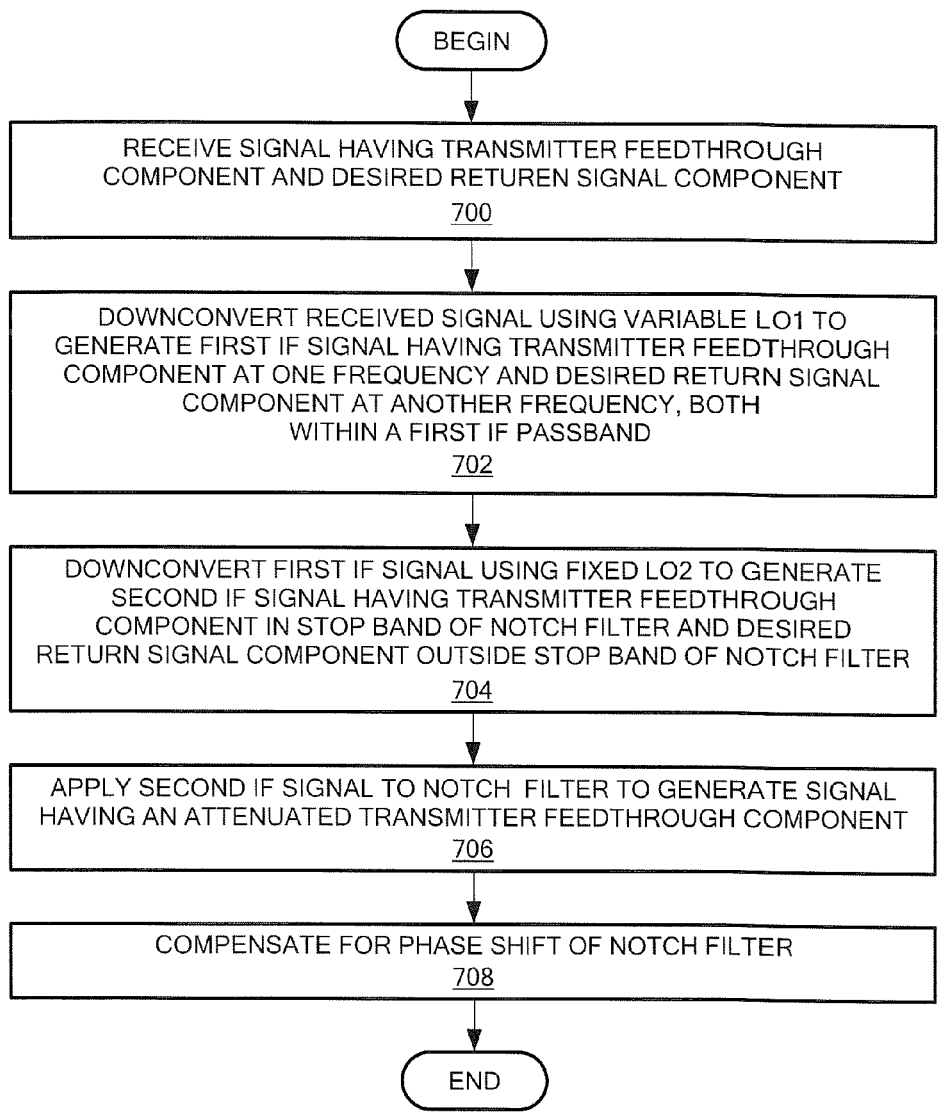
FIG. 13 is a flow diagram illustrating another exemplary sequence of steps to attenuate a presently transmitted frequency in accordance with exemplary embodiments of the invention.

FIG. 13 shows another exemplary sequence of steps that may be used for attenuating a present transmitted frequency in a receiver in accordance with exemplary embodiments of the invention. In step 700, a signal is received that includes an undesired transmitter feedthrough component and a desired return signal component. As described previously, the transmitter feedthrough component may include energy that is received at the receiver directly from the transmitter (i.e., direct path feedthrough) and/or transmitted energy reflected from nearby objects or formations. The return signal component includes energy that has propagated from the transmitter to a remote target, was reflected from the target, and then returned. Because of the extra delay involved in the round trip to the target, the desired return signal may be received at approximately the same time that a subsequent signal is being transmitted from the transmitter of the radar system (at a different frequency). This subsequent transmit signal forms the transmitter feedthrough component.

In step 702, the receive signal is downconverted using a variable LO1 to generate a first IF signal that includes a transmitter feedthrough component at a first (fixed) frequency and the desired return signal component at a second, different frequency. In step 704, the first IF signal is downconverted using a fixed LO2 to generate a second IF signal having a transmitter feedthrough component in the stopband of a fixed band notch filter and a desired return signal component outside of the stopband of the notch filter. In step 706, the second IF signal is applied to the notch filter to generate a filtered signal having an attenuated transmitter feedthrough component. Because the return signal component of the second IF signal is outside the stopband of the notch filter, little or no attenuation of this component takes place in the filter.

In step 708, compensation may be applied to correct for the phase shift of the notch filter. In some implementations, the phase shift compensation may be provided by including a phase shift term within a local oscillator signal used in a subsequent analog mixer in the receiver chain. In other embodiments, the phase shift compensation may be applied digitally in a digital receiver. The digital receiver may also perform one or more digital down conversion steps to generate a base band receive signal.

In at least one embodiment, the signal having the attenuated transmitter feedthrough component that is output by the notch filter may be further downconverted using a variable $LO_3$ to generate a third IF signal that has a desired return signal component at a fixed IF frequency. The frequency of $LO_3$ may tune with the frequency of LO 1 to keep the output frequency of the desired component fixed. In some implementations, digitization and processing (including equalization and filtering) in the digital receiver may be performed after the third down conversion stage.

As will be appreciated by persons of ordinary skill in the art, the sequence of steps illustrated in FIG. 13 may also include one or more additional intermediate processing steps that are not shown. These steps may include, for example, one or more IF amplification steps, one or more attenuation steps (including automatic gain control and leveling control), one or more IF filtration steps, one or more DC offset correction steps, and/or others. These intermediate steps are well known and may vary from implementation to implementation.

One of ordinary skill in the art will recognize that the accurately synthesized LOs, due to a GPS-disciplined reference for example, obviate the need for a sample of the actual transmit frequency at the receiver. In addition, the frequency agility provided by exemplary embodiments allows multiple RF operating channels, limited only by the filter passband bandwidth. Further, channel insertion phase correction is implemented in the receiver hardware through either synthesizer phase tuning with a DDS or FPGA correction with a DDC, following system calibration.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A radar system to attenuate feedthrough, comprising:
   a first combiner to downconvert a received signal to a first intermediate frequency having a fixed frequency;
   a second combiner to combine the first intermediate frequency and a second signal, the second signal comprising a fixed frequency component and an offset component, the offset component corresponding to a difference in frequency between a signal transmitted at a given point in time and a signal received as target return at the given point in time; and
   a filter having a fixed stopband to receive an output of the second combiner for attenuating the downconverted signal transmitted at the given point in time and passing the downconverted target return signal received at the given point in time.

2. The system according to claim 1, further including a phase compensation module to compensate for a phase change from the filter.

3. The system according to claim 2, wherein the phase compensation module includes a third combiner.

4. The system according to claim 1, wherein the first combiner comprises a first mixer to receive the received signal return and a first local oscillator signal.

5. The system according to claim 1, wherein the radar system is operative to track satellites.

6. The system according to claim 1, wherein the radar system uses a GPS-disciplined signal to generate local oscillator frequencies to downconvert the received signal.

7. The system according to claim 1, wherein the filter stopband is about 100 kHz wide.

8. A method, comprising:
   downconverting, using a first combiner, a received signal to a first intermediate frequency having a fixed frequency;
   combining, using a second combiner, the first intermediate frequency and a second signal, the second signal comprising a fixed frequency component and an offset component, the offset component corresponding to a difference in frequency between a signal transmitted at a given point in time and a signal received as target return at the given point in time; and filtering an output of the second combiner with a filter having a stopband for attenuating the downconverted signal transmitted at the given point in time and passing the downconverted target return signal received at the given point in time.

9. The method according to claim 8, further including performing phase compensation to compensate for a phase change from the filter.

10. The method according to claim 9, further including performing the phase compensation using a third combiner.

11. The method according to claim 8, wherein the first combiner comprises a first mixer to receive the received signal return and a first local oscillator signal.

12. The method according to claim 8, wherein the received signal includes reflection from satellites.

13. The method according to claim 8, further including using a GPS-disciplined signal to derive local oscillator frequencies to downconvert the received signal.

14. A satellite tracking radar system, comprising:
a global positioning satellite (GPS) disciplined signal source;
a first mixer to receive signal return from an antenna array, to receive a first local oscillator signal derived from the GPS disciplined signal source, and to output a first intermediate frequency at a fixed frequency;
a second mixer to receive the first intermediate frequency, to receive a second local oscillator signal, and to output a second intermediate frequency signal, wherein the second local oscillator signal includes a fixed frequency component and an offset component, which corresponds to a difference in frequency between a signal transmitted at a given point in time and a signal received as target return at the given point in time; and
a filter having a fixed stopband to receive the second intermediate frequency signal and attenuate the downconverted signal transmitted at the given point in time and pass the downconverted target return signal received at the given point in time.

15. The system according to claim 14, wherein the signal return can include a frequency of 3.5 GHz.

16. The system according to claim 14, wherein the offset component can be 10 MHz.

17. The system according to claim 14, wherein the stopband of the filter is about 100 kHz.

18. The system according to claim 14, further including a diplexer to provide the first local oscillator signal to the first mixer and the second local oscillator signal to the second mixer.

19. The system according to claim 14, further including a phase compensation module to compensate for phase change due to the filter.

20. A radio frequency (RF) receiver system for use in a radar system, comprising:
a receive antenna to receive a signal from a surrounding environment, the received signal having a transmitter feedthrough component and a return signal component, wherein the transmitter feedthrough component and the return signal component are at different frequencies;
a first mixer to downconvert the received signal using a variable frequency local oscillator (LO) signal to generate a first IF signal having a transmitter feedthrough component at one frequency and a return signal component at another frequency, both in a first IF bandwidth;
a notch filter having a fixed stop band;
a second mixer to downconvert the first IF signal using a fixed frequency LO signal to generate a second IF signal having a transmitter feedthrough component at a frequency corresponding to the stop band of the notch filter and a return signal component at a frequency outside the stop band of the notch filter, wherein the notch filter is operative to filter the second IF signal to generate a filtered signal, wherein the notch filter attenuates the transmitter feedthrough component of the second IF signal and substantially passes the return signal component of the second IF signal.

21. The receiver system of claim 20, further comprising:
a digital receiver configured to correct for a phase shift of the notch filter.

22. The receiver system of claim 20, further comprising:
a third mixer to downconvert the filtered signal using a variable frequency LO signal to generate a third IF signal having a return signal component at a fixed IF frequency.

23. The receiver system of claim 22, wherein:
the variable frequency LO signal used by the third mixer includes a phase component to compensate for a phase shift of the notch filter.

24. The receiver system of claim 20, wherein:
the receiver system is part of a satellite tracking radar system.

25. The receiver system of claim 20, wherein:
the variable frequency LO signal used by the first mixer and the fixed frequency LO signal used by the second mixer are both derived from a GPS-disciplined source signal.

26. The receiver system of claim 20, wherein:
the stop band of the notch filter is approximately 100 kHz wide.

27. The receiver system of claim 20, wherein:
the receive antenna includes a phased array antenna.

28. A method of operating a radio frequency (RF) receiver in a radar system, comprising:
receiving a signal having a transmitter feedthrough component and a return signal component, wherein the transmitter feedthrough component and the return signal component of the received signal are at different frequencies;
downconverting the received signal using a variable frequency local oscillator (LO) signal to generate a first intermediate frequency (IF) signal having a transmitter feedthrough component at one frequency and a return signal component at another frequency, both in a first IF bandwidth;
downconverting the first IF signal using a fixed frequency LO signal to generate a second IF signal having a transmitter feedthrough component at a frequency within a stop band of a fixed-band notch filter and a return signal component at a frequency outside the stop band of a fixed-band notch filter; and
applying the second IF signal to the fixed-band notch filter to generate a filtered signal having an attenuated transmitter feedthrough component.

29. The method of claim 28, further comprising:
performing phase compensation to compensate for a phase shift of the notch filter.

30. The method of claim 29, wherein:
performing phase compensation includes downconverting the filtered signal using a variable frequency LO signal to generate a third IF signal having a return signal component at a fixed IF frequency, wherein a variable frequency local oscillator (LO) signal used to downconvert the filtered signal includes a phase compensation component.

31. The method of claim 29, wherein:
performing phase compensation includes compensating for the phase shift of the notch filter within a digital receiver.

32. The method of claim 28, wherein:
the transmitter feedthrough component of the received signal derives from a current transmit signal of a corresponding transmitter and the return signal component derives from a previous transmit signal of the corresponding transmitter.

33. The method of claim 28, wherein:
the variable frequency LO signal used by the first mixer and the fixed frequency LO signal used by the second mixer are both derived from a GPS-disciplined signal source.

34. A radio frequency (RF) receiver system for use in a radar system, comprising:
a receive antenna to receive a signal from a surrounding environment, the received signal having a transmitter feedthrough component and a return signal component, wherein the transmitter feedthrough component and the return signal component are at different frequencies;
a first mixer to downconvert the received signal using a variable-frequency local oscillator (LO) signal to generate a first IF signal having a transmitter feedthrough component and a return signal component; and
an electronically tunable notch filter having an adjustable stop band frequency to filter the first IF signal to generate a filtered signal, wherein the electronically tunable notch filter is controlled to place the stop band at a frequency of the transmitter feedthrough component of the first IF signal.

35. The receiver system of claim 34, further comprising:
a digital receiver to correct for a phase shift of the electronically tunable notch filter.

36. The receiver system of claim 35, further comprising:
a second mixer to downconvert the filtered signal to generate a second IF signal, wherein the second mixer uses an LO signal having a phase component to compensate for a phase shift of the electronically tunable notch filter.

* * * * *